United States Patent [19]

Delpy

[11] 3,911,902
[45] Oct. 14, 1975

[54] CATHETER PRESSURE TRANSDUCER
[75] Inventor: David Thomas Delpy, London, England
[73] Assignee: National Research Development Corporation, London, England
[22] Filed: Aug. 23, 1973
[21] Appl. No.: 390,716

[30] Foreign Application Priority Data
Sept. 8, 1972 United Kingdom............... 41828/72

[52] U.S. Cl. ....... 128/2.05 D; 73/398 C; 128/2.05 E
[51] Int. Cl.² ........................................... A61B 5/02
[58] Field of Search.......... 128/2.05 D, 2.05 E, 2 S, 128/2 L; 73/398 C

[56] References Cited
UNITED STATES PATENTS

| | | | |
|---|---|---|---|
| 2,634,721 | 4/1953 | Greenwood, Jr. ............. | 128/2.05 D |
| 2,796,863 | 6/1957 | von Wittern.................... | 128/2.05 D |
| 2,944,199 | 7/1960 | Hudson......................... | 73/398 C X |
| 2,976,865 | 3/1961 | Shipley.......................... | 128/2.05 D |
| 3,034,356 | 5/1962 | Bieganski et al. .............. | 128/2.05 E |
| 3,190,122 | 6/1965 | Edwards........................... | 73/398 C |
| 3,490,441 | 1/1970 | Curtis ............................ | 128/2.05 D |
| 3,553,625 | 1/1971 | Stedman ..................... | 128/2.05 D X |

FOREIGN PATENTS OR APPLICATIONS 1,262,503   3/1968   Germany ..................... 128/2.05 D Primary Examiner—Kyle L. Howell
Attorney, Agent, or Firm—Cushman, Darby & Cushman

[57] ABSTRACT

A miniature pressure transducer of particular application in surgery is mounted at the tip of a catheter and operates to cause movement of a liquid-gas interface in a capillary tube in response to pressure on the deformable wall of a liquid-filled reservoir. The interface position is sensed in terms of electrical parameters and communicated through the bore of the catheter to external measurement apparatus.

11 Claims, 5 Drawing Figures

CATHETER PRESSURE TRANSDUCER

The present invention relates to pressure sensing assemblies, of the kind comprising a catheter, a miniature pressure transducer carried by the catheter adjacent one end thereof and communication means carried by the catheter whereby operation of the transducer may be sensed at the other end of the catheter. In this specification the term "catheter" means an elongated member suitable for insertion longitudinally into a channel of a living body, whether or not said member is hollow.

Such pressure sensing assemblies have been proposed for use as a replacement for the conventional practice of making measurements of blood pressure, in the region of the heart for example, by inserting a catheter, filled with saline under pressure, which communicates at the external end of the catheter with a pressure transducer such as a resistance strain gauge. In a known form of pressure sensing assembly of the kind specified, the transducer consists of a silicon foil strain gauge. While this known form is generally very suitable for research applications, it is unsuitable for routine clinical use because of the susceptibility of the transducer to damage, and because in the light of its relatively high price it cannot be considered disposable.

It is an object of the present invention to provide a pressure sensing assembly of the kind specified which is improved in these respects.

According to the present invention there is provided a pressure sensing assembly of the kind specified, in which the transducer comprises a substantially rigid-walled capillary tube which is open at at least one end and which contains a liquid column extending along part of the length of the tube from said one end and a gas column extending along the remainder of the length of the tube, and a reservoir filled with liquid which communicates with the liquid column at said one end of the tube, the reservoir having a wall at least a portion of which is deformable by external pressure so as to cause a variation of the position of the gas-liquid interface in the tube, said communication means enabling the position of the gas-liquid interface to be sensed.

Particular arrangements in accordance with the invention will now be described with reference to the accompanying drawings in which.

Figure 1:
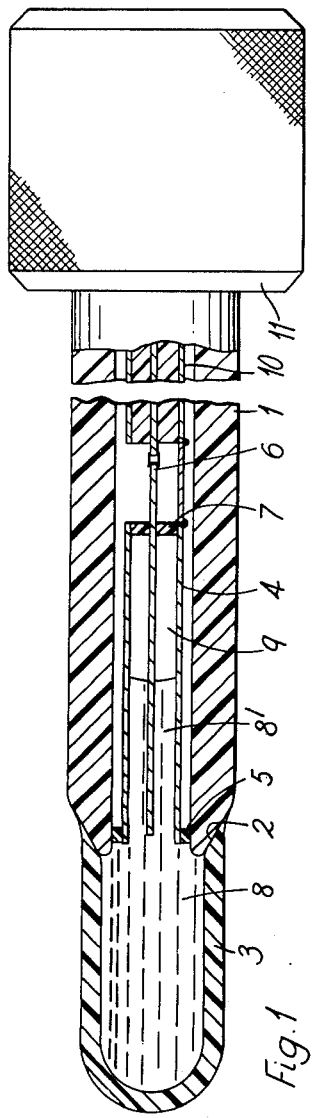
FIG. 1 is a diagrammatic representation of a pressure sensing assembly in which variation of external pressure causes variation in the response to an electrical signal.

Referring to FIG. 1, the assembly comprises a catheter 1, in the form of a tube of a suitable polymeric material such as polyethylene, the tube being of approximately 2.0 mm outside diameter and 0.5 mm wall thickness. One end of the catheter 1 is sealed into the open end 2 of a domed chamber 3 of silicone rubber about 10mm long and having a flexible wall. A rigid thin-walled electrically conducting tube 4 extends coaxially within the bore of the catheter 1 and a seal 5 is made between the outer surface of the tube and the inner surface of the catheter 1 close to their respective ends. The tube 4 is a length of tubing such as is used for hypodermic needles, typically of 0.6 mm outside diameter and 0.15 mm wall thickness. A wire 6 of 0.1 mm diameter extends coaxially within the whole length of the bore of the tube 4 and passes through a seal 7 at the end of the tube 4 remote from the seal 5. The wire 6 and the inner surface of the tube 4 form the electrodes of a capacitor from which a coaxial cable 10 is carried through the length of the catheter 1 to a coaxial connector 11 for external connection to capacitance-sensing and indicating apparatus. The chamber 3 and the adjacent portion of the tube 4 are filled with a liquid 8 of very low electrical conductivity such as deionised water or oil and the remaining internal volume of the tube 4 is filled with an air column 9. Where water is used as the dielectric liquid 8, the wire 6 may have an inert insulating coating. As alternatives to the coaxial cable 10, conductors may be formed on the inner surface or carried in the thickness of the wall of the catheter 1.

In operation, deformation of the flexible wall of the chamber 3 due to a change in the external pressure results in an increase or decrease in volume of the air enclosed in the tube 4 and a change in capacitance between the wire 6 and the tube 4 in response to the change in the position of the air-liquid interface in the tube 4. The initial volume and pressure of the enclosed air must therefore be chosen so that over the whole range of external pressure to be indicated the air-liquid interface lies within the tube 4.

As an alternative to operation against a fixed internal pressure, a differential pressure indicating system may be provided by connecting the air volume in the tube 4 to a source of pressure which may be varied in a controlled manner.

As an alternative to the use of a separate tube 4 the inner wall of the catheter 1 may be metallised so as to perform as one electrode of the sensing capacitor. The wall of the catheter 1 is sufficiently rigid to be unaffected by the external pressure.

It will be clear that a structure similar to that described above may be adapted as an electrical resistance transducer, the liquid 8 being made at least slightly conductive and the wire 6 having a non-insulated surface and being mounted so that contact with the inner wall of tube 4 is prevented.

Figure 2:
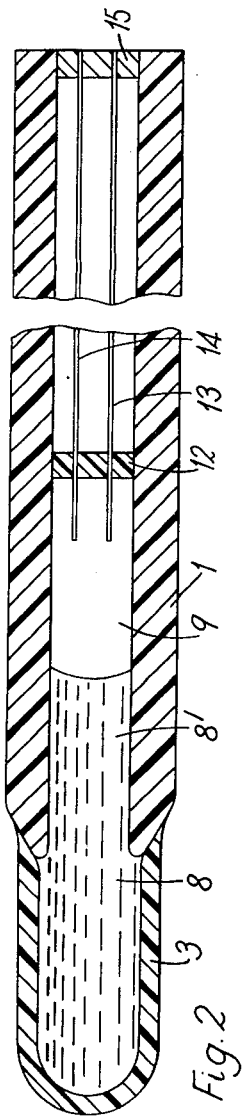
FIG. 2 is a diagrammatic representation of a pressure sensing assembly in which variation of external pressure causes variation in the response to an optical signal.

Referring to FIG. 2 a liquid-filled chamber 3 is sealed to a catheter 1 as in FIG. 1 but the liquid column 8' and the air column 9 are formed within the bore of the catheter 1. The air column 9 terminates at a plug 12 which seals the bore of the catheter 1. Passing through the plug 12 are two glass or other optically transmitting fibres 13 and 14 which project a short distance into the air column 9 and from the opposite side of the plug 12 extend through the bore to the end of the catheter 1 where an optical terminal block 15 is mounted. The block 15 is adapted to receive a light source (not shown) for the transmission of light along the fibre 13 and a light sensor (not shown) for the detection of light transmitted by the fibre 14. The fibres 13 and 14 are so arranged that light is received by the fibre 14 from the fibre 13 only after reflection at the surface of the liquid column 8' and its intensity is therefore a measure of the position of the liquid surface.

Figure 3:
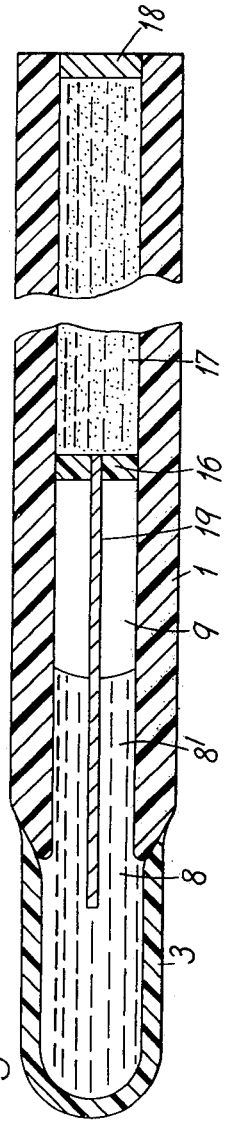
FIG. 3 is a diagrammatic representation of a pressure sensing assembly in which variation of external pressure causes variation in the response to an ultrasonic signal.

Referring to FIG. 3 the liquid column 8' and the air column 9 are formed within the bore of the catheter 1 as in FIG. 2 and the air column 9 terminates at a sealing plug 16. The space between the plug 16 and the remote end of the catheter 1 is filled by a material 17 such as a gel, which is sufficiently flexible not to interfere with the bending of the catheter 1 but is an efficient transmitting medium for ultrasonic energy.

Ultrasonic energy is introduced into the transmitting path by the coupling of a transducer (not shown) to a block 18 which seals the end of the catheter 1 remote from the liquid column 8'. In order to extend the transmission path into the liquid column 8' a metal pin 19 extends from the plug 14, which is itself an efficient ultrasonic transmitting medium, through the air column 9 into the chamber 3 without touching the side walls.

In operation an ultrasonic pulse coupled into the block 18 travels through the gel 17 and into the pin 19. A reflection will occur at any discontinuity in the path of the pulse and will be detected on its return by a receiving transducer (not shown) coupled to the block 18. Such a reflection will occur at the discontinuity presented by the point at which the pin 19 enters the liquid column 8', the position of the liquid surface then being calculable in terms of the delay time of the reflection.

Pressure transducers of the types described above are capable of operation, within at least the range of conditions imposed by bio-medical investigation, to a probable accuracy of ± 1 mm Hg. In the course of such an investigation the range of pressures encountered may be from − 20 to + 200 mm Hg relative to atmospheric pressure; the rate of fluctuation of pressure is such that the sensor must respond to frequencies in the range from zero to 50 Hz. The frequency response is principally dependent on the flexure characteristics of the deformable dome 3 and may therefore be determined by the selection of material of appropriate wall thickness and type. Where the material may be deposited from solution the wall thickness may be easily controlled by coating a wax form of the desired dome shape.

The viscosity of the liquid 8 also contributes to the frequency response and the range of viscosities available in silicone oils usually enables a choice suitable for any application to be made. Normally a low viscosity will be appropriate in order to maintain the highest possible frequency response.

Figure 4:
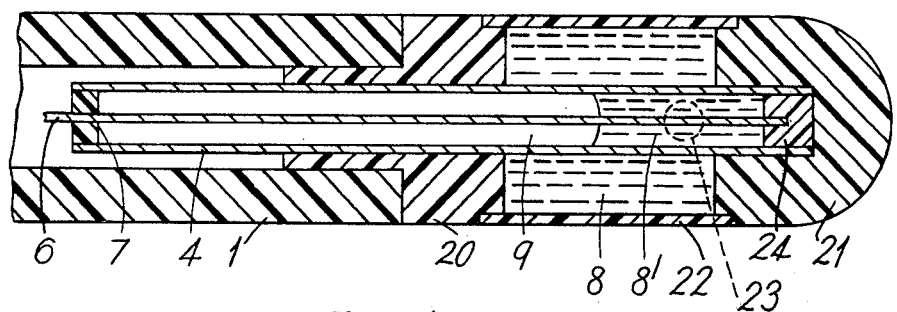
FIGS. 4 and 5 are diagrammatic representations of preferred modifications of the transducer shown in FIG. 1.
Figure 5:
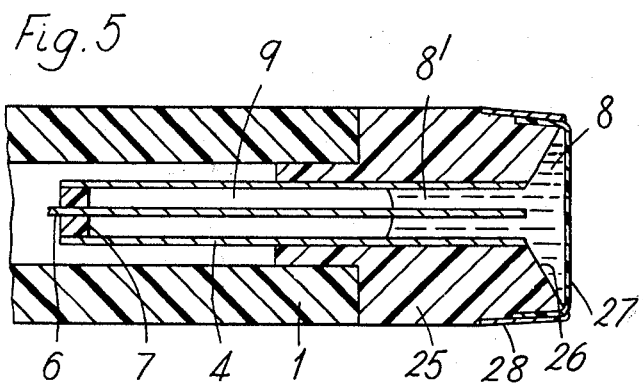

As an alternative to the unsupported flexible dome 3 of FIGS. 1, 2 and 3 it may be desirable to provide a flexible membrane mounted so as to be insensitive to bending forces; FIGS. 4 and 5 show modifications of the arrangement of FIG. 1 in which this alternative is adopted. It will be readily appreciated that the arrangements of FIGS. 2 and 3 may be similarly modified.

Referring to FIG. 4, the tube 4, instead of terminating at the end of the catheter 1, is sealed through a rigid plug 20 sealed into the end of the catheter 1, the end of the tube 4 being sealed into a rigid end-piece 21. An annular volume between the plug 20 and the end-piece 21 is enclosed by a flexible membrane 22 sealed to both the plug 20 and the end-piece 21. The annular volume is filled with liquid 8 which also forms a column 8' in the portion of the tube 4 which terminates in the end-piece 21. A hole 23 in the wall of the tube 4 close to the end-piece 21 provides communication between the annular volume and the column 8'. The plug 20 and the end-piece 21 may suitably be of nylon or polyvinyl chloride. The wire 6 is held rigidly at each end of the tube 4, and the capacitance thereby stabilized, by a seal 24 in addition to the seal 7 shown in FIG. 1.

Water is suitable for use as the liquid 8, if it is deionised and free from air, and the membrane 22 may then be a layer of silicone rubber alone. If the liquid 8 is oil the silicone rubber membrane 22 is to some extent permeable and an outer layer of impermeable polyvinyl chloride should be applied to the membrane 22. In conjunction with a plug 20 and an end-piece 21 of the same material such a layer of polyvinyl chloride then completely seals the catheter tip.

In assembling the transducer, care is required to avoid the formation of air bubbles in the reservoir liquid 8 for example by adopting the following procedure. The sub-assembly of the plug 20, the end-piece 21 and the membrane 22 is filled to overflowing with liquid and the sub-assembly of the tube 4 and the wire 6 held together by the seals 7 and 24 is then pushed through the plug 20 until it locates in the end-piece 21. The small annular gap between the tube 4 and the plug 20 is then sealed.

Referring to FIG. 5, the tube 4 is sealed into a rigid plug 25 which is sealed into the end of the catheter 1. The end of the plug 25 remote from the catheter 1 is formed to provide a cavity 26 leading into the tube 4, the open end of the cavity 26 being sealed by a flexible membrane 27 and the membrane 27 being secured to the plug 25 by a retaining ring 28. The cavity 26 and the adjacent portion of the tube 4 are filled with oil. In an alternative construction the retaining ring 28 may be dispensed with by the use of a membrane 27 of nylon welded to the plug 25, in this case also of nylon. Since the membrane 27 is formed from sheet material there is a greater choice of materials than is available for the membrane 22 of FIG. 4. Of the two arrangements shown in FIGS. 4 and 5 the side-wall mounting shown in FIG. 4 is in surgical use preferred to the end mounting shown in FIG. 5 because it is less liable to cause spurious pressure indications in situations where the catheter tip may be pressed against an arterial wall or may encounter high-velocity blood-flow. For either arrangement a membrane thickness in the range 0.001 inch − 0.003 inch would be typical although other thicknesses could be used according to the characteristics required and similar sensitivity and linearity of response up to 200 mm Hg would be attainable.

I claim:

1. A pressure sensing assembly comprising:
   a catheter;
   a miniature pressure transducer carried by the catheter adjacent one end thereof, said transducer comprising
   a substantially rigid-walled capillary tube which is open at at least one end and which contains a liquid column extending along part of the length of the tube from said one end and a gas column extending along the remainder of the length of the tube, and
   a reservoir filled with liquid which communicates with the liquid column at said one end of the tube, the reservoir having a wall at least a portion of which is deformable by external pressure so as to cause a variation of the position of the gas-liquid interface in the tube; and communication means carried by the catheter for enabling the position of said interface to be sensed at the other end of the catheter.

2. A pressure sensing assembly according to claim 1 in which the liquid is a dielectric and said communication means comprises a pair of spaced electrodes the capacitance between which is dependent upon the position of the gas-liquid interface, and a pair of conducting leads respectively connected to said electrodes and extending to said other end of the catheter.

3. A pressure sensing assembly according to claim 2 in which said spaced electrodes are in overlapping coaxial relationship.

4. A pressure sensing assembly according to claim 1 in which said deformable wall portion extends substantially parallel to the longitudinal axis of the catheter.

5. A pressure sensing assembly according to claim 4 in which said deformable wall portion is in the form of a tubular member closed at one end by a rigid sealing member and sealed at the other end to said one end of the catheter.

6. A pressure sensing assembly comprising:

a catheter having a first end and a second end;

a miniature electrical pressure transducer including a chamber filled with liquid and having a wall at least a portion of which is deformable, an impedance-sensing element comprising a pair of elongated electrodes extending parallel to each other, and impedance-varying means whereby variations in the pressure of the liquid in said chamber are effective to cause variations in the electrical impedance measurable between said electrodes;

means mechanically connecting said transducer to said catheter adjacent said first end thereof with said deformable part of said wall exposed for contact with an external medium whose pressure is to be sensed; and a pair of electrical conductors respectively electrically connected to said electrodes and extending therefrom along the length of said catheter to said second end thereof wherein the improvement comprises the incorporation in said impedance-varying means of:

a substantially rigid-walled capillary tube having its length extending parallel to said electrodes and having adjacent a first end thereof an opening through which the interior of said tube communicates with the interior of said chamber;

a column of liquid contained by said tube and in contact with the liquid in said chamber, said liquid column extending along only part of the length of said tube from said first end thereof; and a column of gas contained by said tube and extending along the remainder of the length of said tube, said gas column meeting said liquid column at an interface at least part of which is disposed between said pair of electrodes.

7. A pressure sensing assembly according to claim 6, in which one of said electrodes is constituted by said tube and the other of said electrodes extends along the interior of said tube.

8. A pressure sensing assembly according to claim 6, in which said liquid column is electrically insulating.

9. A pressure sensing assembly according to claim 6, in which said liquid column is electrically conducting and is in direct contact with both of said electrodes.

10. A pressure sensing assembly according to claim 1 in which the liquid is a conductor and said communication means comprises a pair of spaced electrodes the resistance between which is dependent upon the position of the gas-liquid interface, and a pair of conducting leads respectively connected to said electrodes and extending to said other end of the catheter.

11. A pressure sensing assembly according to claim 1 in which the said deformable wall portion extends substantially perpendicularly to the longitudinal axis of the catheter and has a surface area considerably greater than the cross-sectional area of said capillary tube.

* * * * *